United States Patent

Briffett et al.

[11] Patent Number: 6,154,665
[45] Date of Patent: *Nov. 28, 2000

[54] RADIO TELEPHONE PROXIMITY DETECTOR

[75] Inventors: Neil Briffett, Surrey, United Kingdom; Maini Williams, Tampere, Finland

[73] Assignee: Nokia Mobile Phones Limited, Espoo, Finland

[ * ] Notice: This patent is subject to a terminal disclaimer.

[21] Appl. No.: 08/955,916

[22] Filed: Oct. 22, 1997

[30] Foreign Application Priority Data

Oct. 23, 1996 [GB] United Kingdom ................... 9622081

[51] Int. Cl.⁷ ...................................... H04B 1/38
[52] U.S. Cl. ...................... 455/574; 455/575; 455/462; 455/88
[58] Field of Search .................................. 455/421, 410, 455/411, 90, 575, 348, 349, 351, 567, 550, 517, 100, 566; 340/568.1, 539, 531, 571

[56] References Cited

U.S. PATENT DOCUMENTS

| | | | |
|---|---|---|---|
| 4,853,951 | 8/1989 | Bauer | 455/411 |
| 5,287,553 | 2/1994 | Korycan | 455/575 |
| 5,298,883 | 3/1994 | Pilney et al. | 455/575 |
| 5,396,218 | 3/1995 | Olah | 340/539 |
| 5,410,141 | 4/1995 | Koenck et al. | 455/90 |
| 5,524,277 | 6/1996 | Yoshioka et al. | 455/550 |
| 5,557,259 | 9/1996 | Musa | 455/100 |
| 5,583,488 | 12/1996 | Sala et al. | 340/568.1 |
| 5,638,423 | 6/1997 | Grube et al. | 455/349 |
| 5,714,932 | 2/1998 | Castellon et al. | 340/539 |
| 5,722,071 | 2/1998 | Berg et al. | 455/567 |
| 5,757,271 | 5/1998 | Andrews | 340/568.1 |
| 5,760,690 | 6/1998 | French | 340/571 |
| 5,771,446 | 6/1998 | Wilkinson | 455/411 |
| 5,796,338 | 8/1998 | Mardirossian | 340/568.1 |
| 5,892,447 | 4/1999 | Wilkinson | 455/566 |
| 5,943,628 | 8/1999 | Barrett et al. | 455/575 |

FOREIGN PATENT DOCUMENTS

0581416 A1  2/1994  European Pat. Off. .
0683587 A1  11/1995  European Pat. Off. .

OTHER PUBLICATIONS

WPI Abstracts Accession No. 95–352005/46 & CN 1095532A (YANG), Nov. 23, 1994.

Primary Examiner—Reinhard J. Eisenzopf
Assistant Examiner—Greta J. Fuller
Attorney, Agent, or Firm—Perman & Green, LLP

[57] ABSTRACT

A radiotelephone proximity detector, comprising a first proximity unit associated with a radiotelephone and a second proximity unit associated with a user wherein the second proximity unit includes a transmitter for transmitting a proximity signal, and the first proximity unit includes a receiver for receiving the proximity signal and an analysis unit for estimating the proximity of the first and second proximity units on the basis of the received proximity signal, the first proximity unit being operable when the estimated proximity of the first and second proximity units exceeds a threshold to cause the radiotelephone to change into an operating mode in which its normal use is prevented.

4 Claims, 9 Drawing Sheets

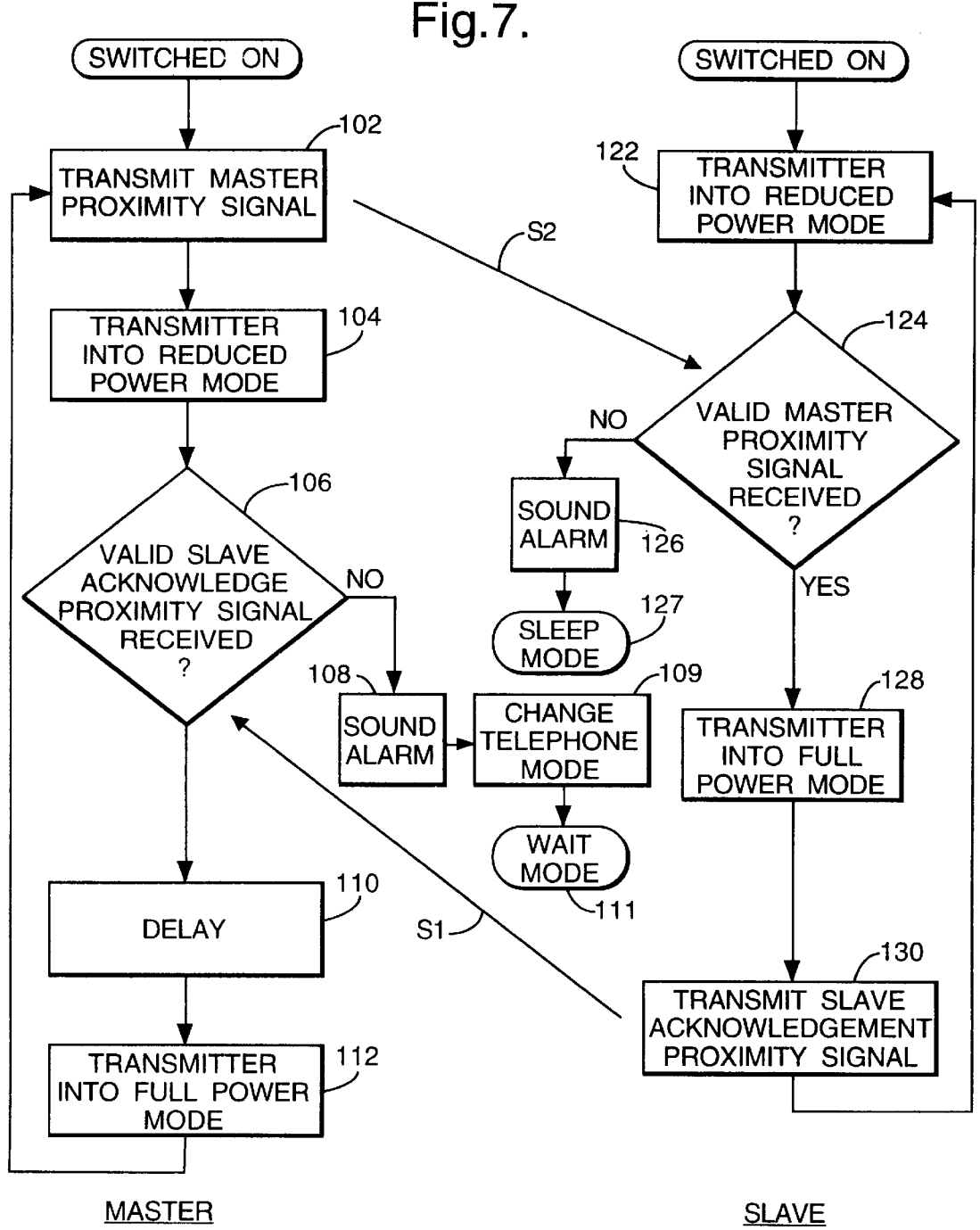

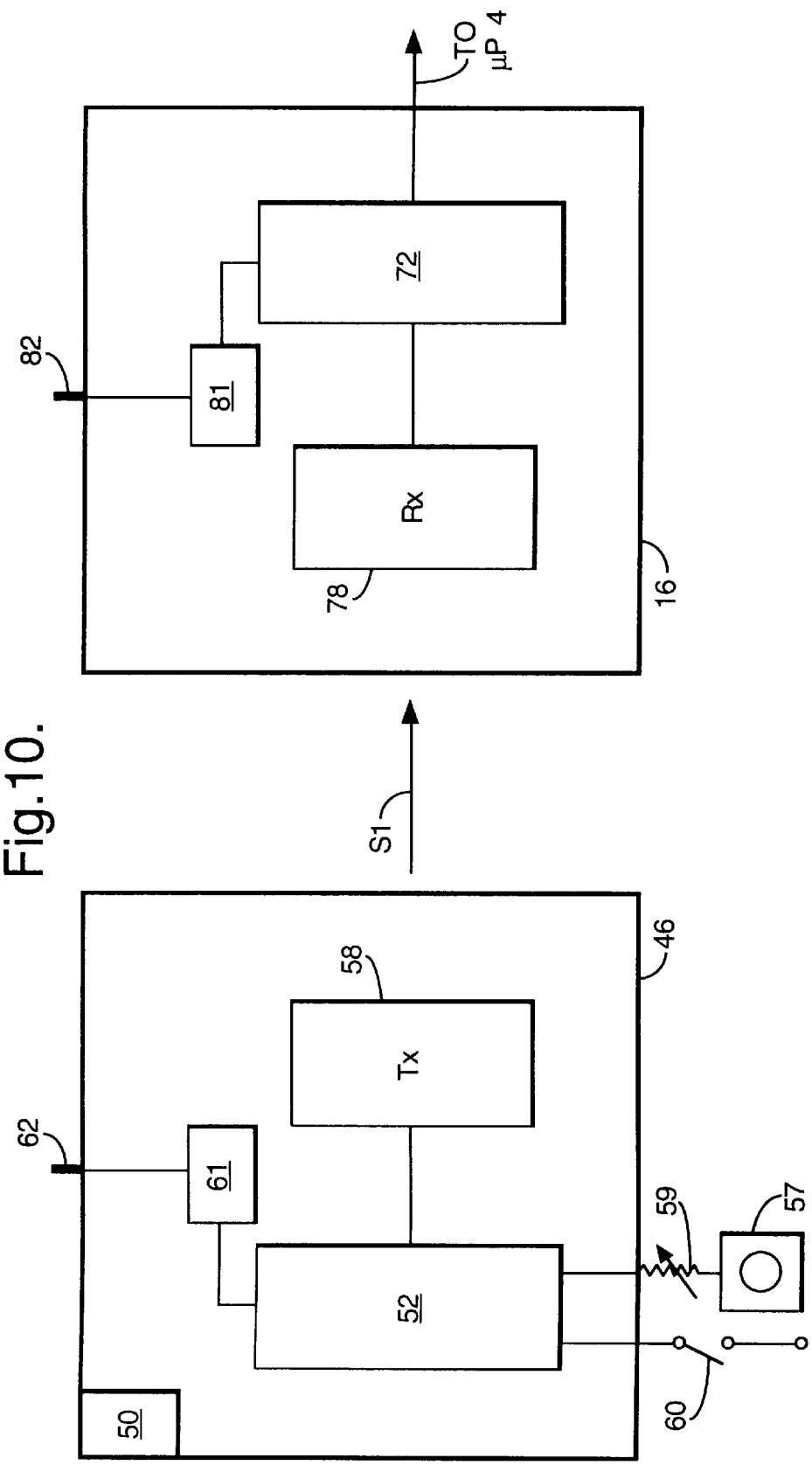

RADIO TELEPHONE PROXIMITY DETECTOR

BACKGROUND OF THE INVENTION

The present invention relates to a radiotelephone proximity detector.

Portable radiotelephones by virtue of their mobility are easily misplaced or stolen. The present invention aims generally to tackle these problems. More specifically when a radiotelephone is misplaced or stolen, it is vulnerable to misuse by an unauthorised person particularly if it is misplaced or stolen when the security lock is not activated. An unauthorised person is then able to place calls which are charged to the owner of the radiotelephone and also access confidential information which may be stored in the radiotelephone's memory.

SUMMARY OF THE INVENTION

With this in mind, the present invention provides a radiotelephone proximity detector, comprising a first proximity unit associated with a radiotelephone and a second proximity unit associated with a user, wherein the second proximity unit includes a transmitter for transmitting a proximity signal, and the first proximity unit includes a receiver for receiving the proximity signal and an analysis unit for estimating the proximity of the first and second proximity units on the basis of the received proximity signal, the first proximity unit being operable when the estimated proximity of the first and second proximity units exceeds a threshold to cause the radiotelephone to change into an operating mode in which its normal use is prevented.

For example, in one embodiment the first proximity unit estimates the proximity of the first and second proximity units by comparing the received signal strength of a proximity signal transmitted by the second proximity unit with a threshold. It this received signal strength falls below the threshold, then the first proximity unit estimates that the second proximity unit is too far away from the first proximity unit and causes the radiotelephone to change into an operating mode in which its normal use is prevented. For example, in one such mode, the security lock may be activated such that the radiotelephone may require a correct personal identification or so-called PIN number is entered before any further use can be made of the phone. In another mode, the call placing capability of the radiotelephone may be inhibited but the capability to receive a call may be available. Additionally, the capability to access user-definable data, such as menu structures and phone number/name lists, may also be inhibited.

By such features it will be appreciated that the ability of the authorised person to misuse the radiotelephone is severely limited.

In other embodiments, the proximity of the first and second proximity units is estimated by the time taken for the proximity signals to travel between the first and second proximity units. Preferably, the first proximity unit is located within the casing of the radiotelephone and is powered by the battery of the radiotelephone. The transmitter of the second proximity unit is preferably dedicated to the task of monitoring the first and second proximity units. In other embodiments, the main transceiver of the radiotelephone which transmits and receives signals to and from the cellular network can also perform the role of the receiver of the second proximity unit. Preferably, the second proximity unit is associated with the user by being integrated with means which are ordinarily worn or carried by the user, for example, a belt clip assembly, a hearing aid, a brief case or a case for carrying the radiotelephone.

The communication link is preferably established using radio wave transmission, but other techniques such as ultrasonic wave transmission can also be used.

BRIEF DESCRIPTION OF THE DRAWINGS

Exemplary embodiments of the invention are hereinafter described with reference to the accompanying drawings, in which:

FIG. 7 is a flow diagram showing the operation of the proximity units in the separated or away position;

FIG. 10 is a schematic showing the interaction between a second preferred embodiment of the proximity unit of the belt clip assembly and the telephone.

DESCRIPTION OF THE PREFERRED EMBODIMENTS

Figure 1:
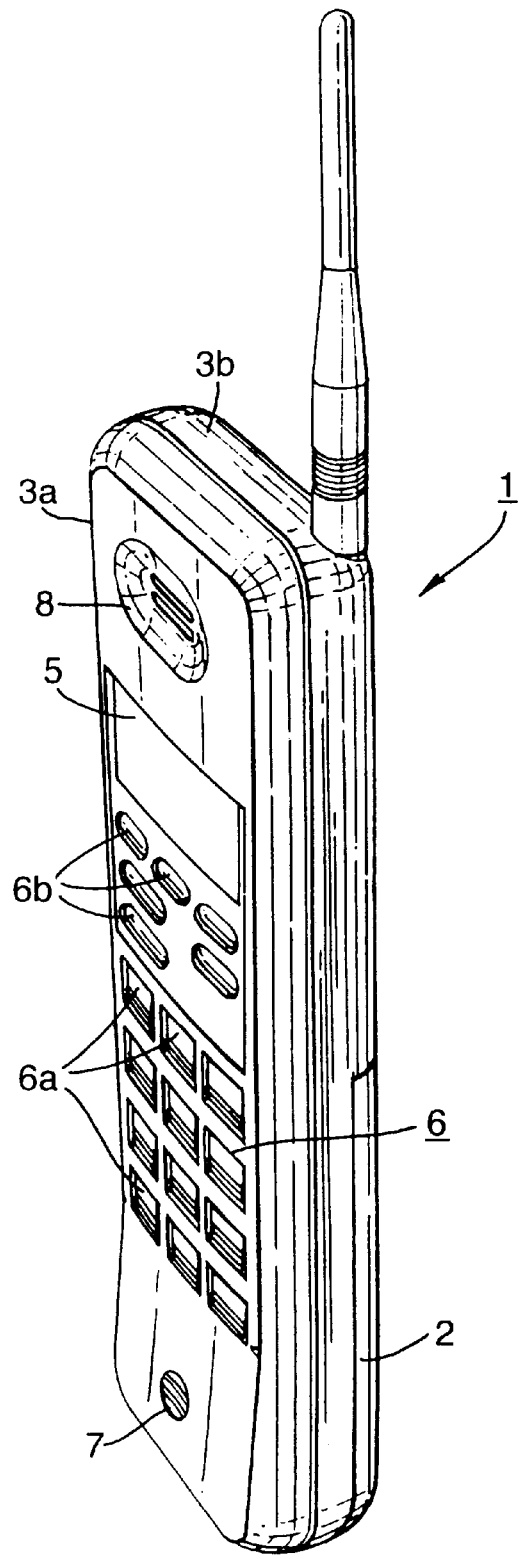
FIG. 1 is a perspective of a cellular mobile telephone.
Figure 2:
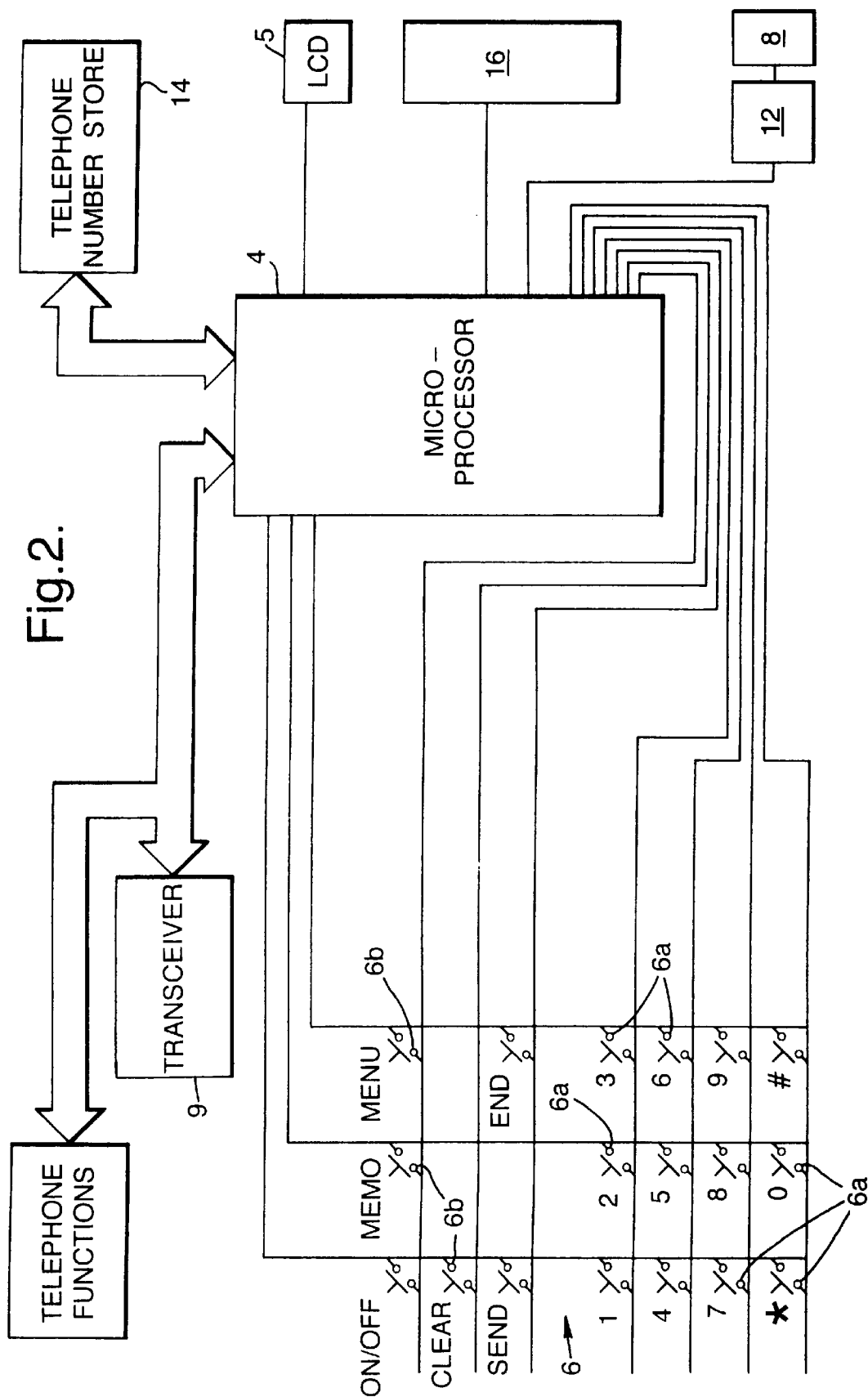
FIG. 2 is a schematic diagram of the main features in the telephone of FIG. 1.

The telephone apparatus shown in FIG. 1 is a cellular mobile telephone having an A or front cover 3a and a B or rear cover 3b powered by a rechargeable battery pack 2. The telephone 1 includes a transceiver 9 for transmitting and receiving signals to and from the cellular network and all the other features conventionally found in a cellular telephone, as shown schematically in FIG. 2. Since these aspects of the telephone are not directly relevant to the instant invention no further details will be given here, except to say that a microprocessor 4 (see FIG. 2) is employed to control all the basic functions of the telephone 1 and to control the keypad, display functions and a tone generator 12. Additionally, a memory 14 is provided for storing third party subscriber telephone records. The user-interface of telephone 1 comprises a display, e.g. a liquid crystal display 5 and a keypad 6 on the front of the telephone 1. The display is coupled to and regulated by the microprocessor 4. The keypad 6 essentially comprises two main sets of keys, namely alphanumeric keys 6a associated with alphanumeric data especially for dialling telephone numbers, but also for entering alphanumeric data into the telephone number store 14; and a set of function keys 6b for enabling various predetermined functions or operations.

The telephone also includes a microphone 7, a loudspeaker 8, and a proximity unit 16 which will be described in greater detail later.

The mobile telephone is equipped with a belt clip assembly 20 which enables a user to attach the telephone 1 to his belt for convenient transportation when the telephone is not in use. The belt clip assembly 20 is in its mechanical aspects largely known in the art. Full details of its mechanical construction can be found in EP-A1-683587, but for the sake of completeness the following brief description is included.

Figure 3:
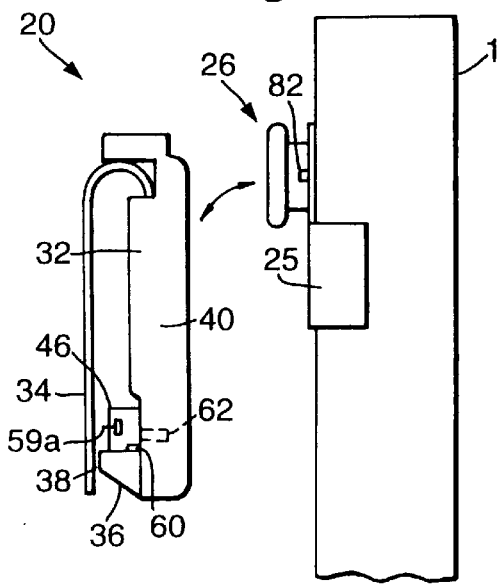
FIG. 3 is a side view of the telephone of FIG. 1 together with a belt clip assembly.
Figure 5:
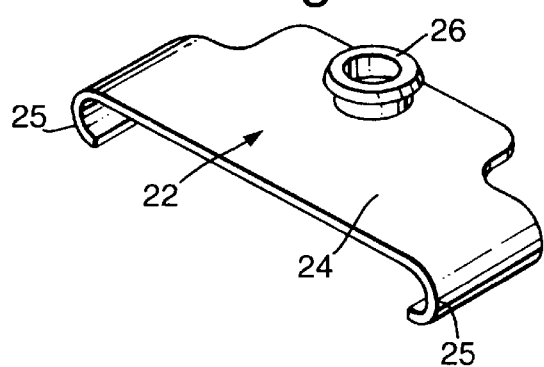
FIG. 5 is a perspective view of the clip member of the belt clip assembly of FIG. 3 in isolation.

The belt clip assembly 20 comprises a clip member 22 as shown in FIG. 5. The clip member 22 removably snap-fits onto the rear of the telephone casing. The clip member 22 includes a planar member 24 having bent ends which serve as arms 25 to removably grasp in a snap-fit manner the telephone casing as shown in FIG. 3. A first fastening element 26 upstands from the planar member 24. The belt clip assembly 20 further comprises a body portion 28 which attaches to a belt 30 of a user. The body portion 28 comprises a back member 32 from which rearwardly projects a j-shaped member 34 and a protrusion 36. The j-shaped member 34 and the protrusion 36 define a channel 38 as shown in FIG. 3 within which the belt 30 can be slid and retained. Guide flanges 40 project forwardly from the back member 32 and define a region 41 into which the first fastening element 26 of the clip member 22 can be slid. A second fastening element 42 projects forwardly into the region 41 and can co-operate with the first fastening element 26 to secure the clip member 22 and hence the telephone in place.

The belt clip assembly 20 further comprises a proximity unit 46 mounted to the rear of the back member 32.

Figure 6:
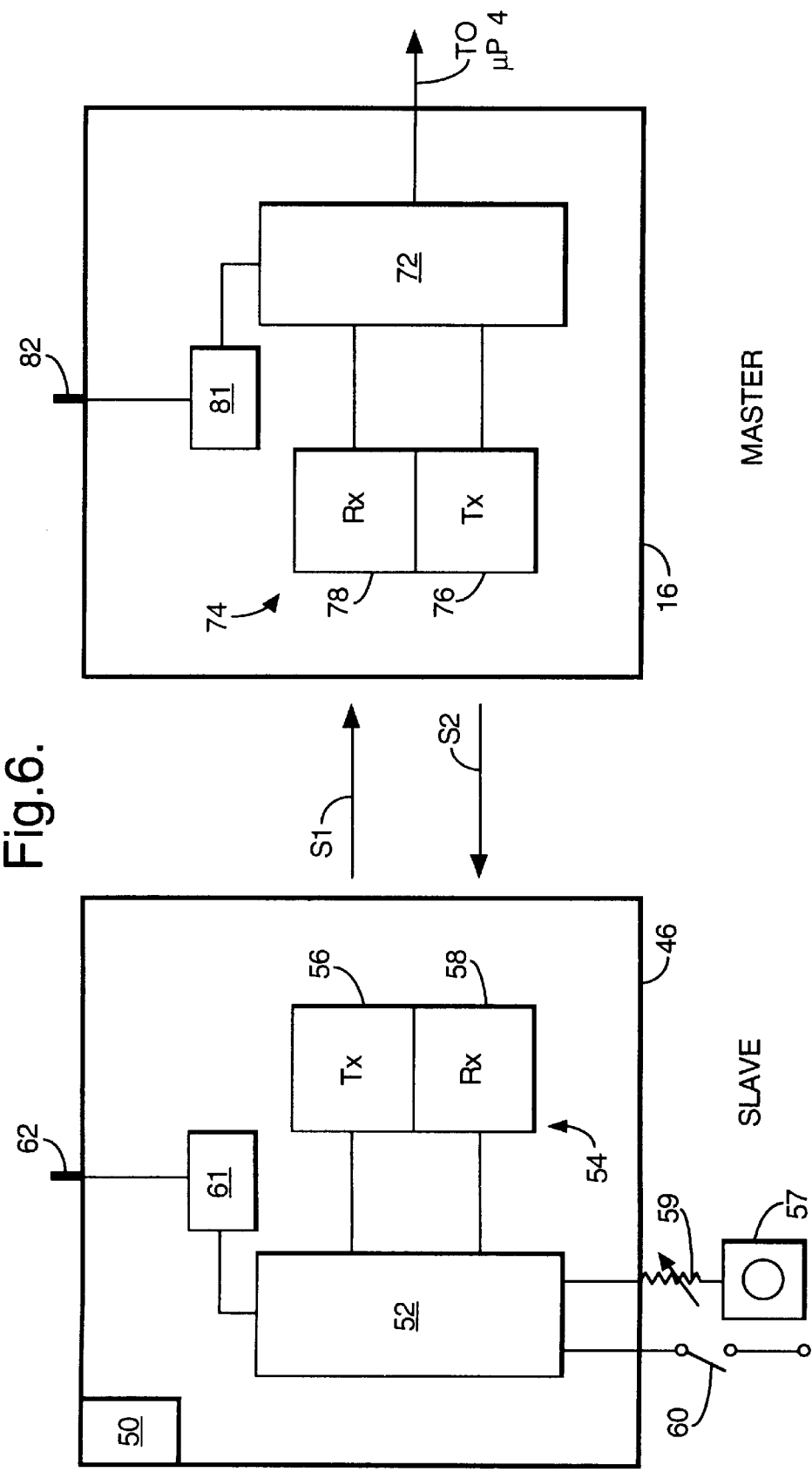
FIG. 6 is a schematic showing the interaction between a first preferred embodiment of the proximity unit of the belt clip assembly and the telephone.

The telephone proximity unit 16 and the belt clip assembly proximity unit 46 are shown in FIG. 6.

The belt clip assembly proximity unit 46 is powered by a low power supply 50 including a replaceable battery. The proximity unit 46 also comprises a controller 52 which controls the operation of a transceiver 54. The controller 52 can be implemented as dedicated combinational logic or as a microprocessor. The transceiver 54 comprises a transmitter 56 and a receiver 58 for transmitting and receiving a lower power ultra high frequency (UHF) signals to and from the telephone proximity unit 16, respectively. The transceiver 54, under control of the controller 52, can be switched into a reduced power mode in which the transmitter 56 is non-operational. The controller 52 also controls a loudspeaker 57, the output volume of which is controllable by the user via a potentiometer 59. A slideable control member of the potentiometer 59 is denoted in FIG. 3 by reference numeral 59a. The controller 52 is also responsive to the state of a depressable key 60.

The telephone proximity unit 16 is powered by the battery 2 of the telephone. The proximity unit 16 also comprises a controller 72 which controls the operation of a transceiver 74. The controller 72 can be implemented as dedicated combinational logic or as a microprocessor. The transceiver 74 comprises a transmitter 76 and a receiver 78 for transmitting and receiving lower power ultra high frequency (UHF) signals to and from the proximity unit 46, respectively. The transceiver 74, under the control of the controller 72, can be switched into a reduced power mode in which the transmitter 76 is non-operational. The controller 72 is controlled by the microprocessor 4 of the telephone 1.

Figure 4:
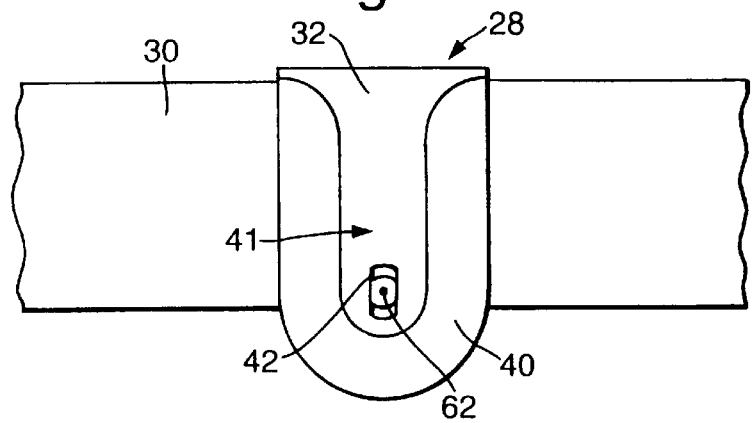
FIG. 4 is a front view of the body of the belt clip assembly of FIG. 3 attached to a belt.

The belt clip proximity unit 46 further comprises detection circuitry 61 having a detecting contact 62. The detecting contact 62 is located, as can be seen in FIG. 4, in the second fastening element 42. The telephone proximity unit 16 further comprises detection circuitry 81 having a detecting contact 82. The detecting contact 82 projects through the rear casing or cover 3b so as to be located, as can be seen in FIG. 3, in the first fastening element 26. When the telephone 1 is mounted to the belt clip assembly 20 in a so-called 'home position', the detecting contacts 62, 82 electrically contact each other. The presence of the telephone 1 is thereby electrically signalled to the detection circuitry 61 and hence the controller 52, and the presence of the belt clip assembly is likewise electrically signalled to the controller 72.

As can be seen in FIG. 6, the transmitter 56 is operable to transmit a signal S1 comprising a carrier signal at a frequency F1 having identification coding C1, indicating the belt clip proximity unit 46 as the origin of the signal, modulated into it. The receiver 78 is operable to receive and demodulate the identification coding from the signal S1 and communicates this and also the power or strength of the received signal to the controller 72. Similarly, the transmitter 76 is operable to transmit a signal S2 comprising a carrier signal at frequency F2 having identification coding C2, indicating the telephone proximity unit 16 as the origin of the signal, modulated into it. The receiver 58 is operable to receive and demodulate the identification coding from the signal S2 and communicates this and also the power or strength of the received signal to the controller 52. The belt clip proximity unit 46 and the telephone proximity unit 16 are a 'matched pair' in that the belt clip proximity unit 46 is pre-programmed to recognise the identification coding C2 of the telephone proximity unit 16 and vice versa.

In operation, when the telephone 1 is in its home position, this is detected, as a result of the electrical contact between detecting contacts 62, 82, by the detection circuitries 61, 81 which place the proximity units 16, 46 into a sleep or standby mode. In the sleep mode, only the detection circuitries 61, 81 consume energy, albeit a very small amount, the rest of the units 16, 46 being switched off. When the telephone is removed from the belt clip proximity unit 46 it is in a so-called 'away position' in which there is no electrical contact between the detecting contacts 62, 82. The absence of electrical contact between the detecting contacts 62, 82 triggers the detection circuitries 61, 81 which switch on the proximity units 46, 16.

Figure 8A:
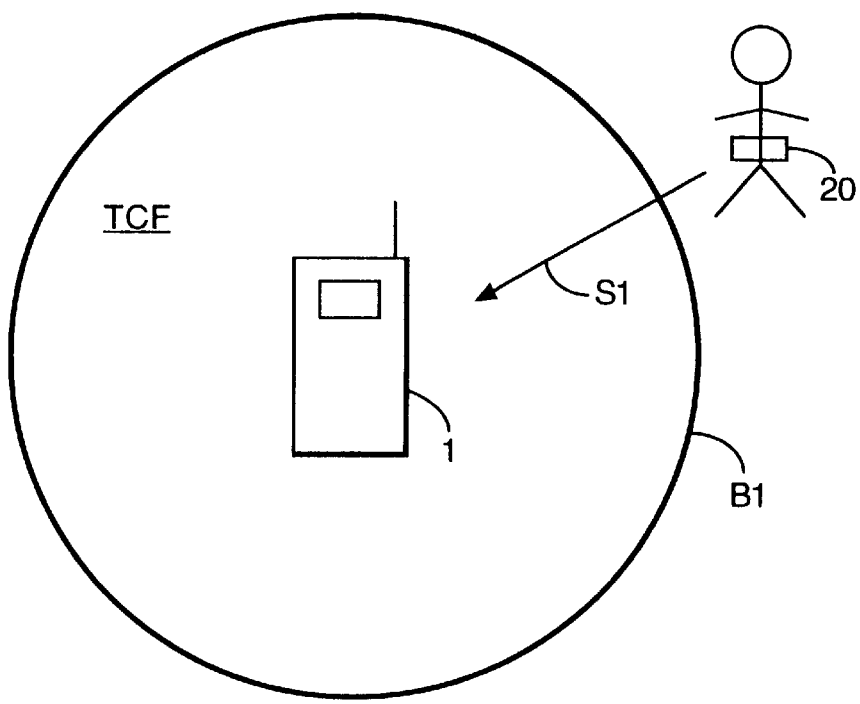
FIGS. 8(a) and 8(b) show diagrams of the control field set up by the telephone proximity unit.
Figure 8B:
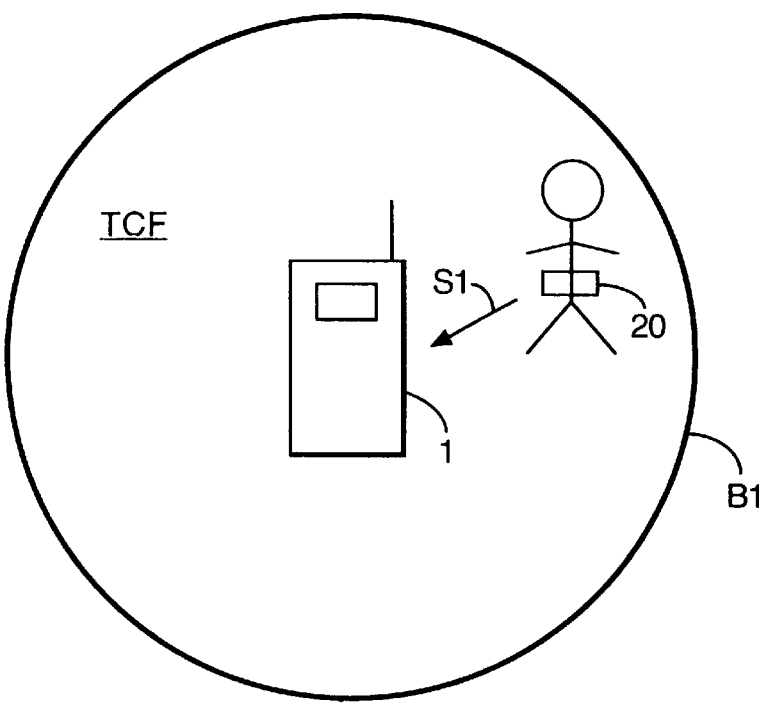

In the away position, the proximity units 16, 46 switch on and operate as shown in the flow diagram of FIG. 7. The telephone proximity units 16 acts as master and the belt clip proximity unit 46 acts as slave. Referring first to the operation of the telephone proximity unit 16, its transmitter 76 transmits master proximity signal S2 at step 102. After this transmission, the transmitter is switched into reduced power mode at step 104. Next, at step 106, its receiver 78 waits to receive the slave acknowledgement proximity signal S1 from the 'matched' belt clip proximity unit 46. If no signal is received within a predetermined interval, say T, or within this interval a signal is received but the identification coding does not match or equal C1, step 108 is executed by which an alarm is sounded for a brief interval. Similarly, should the correct signal S1 bearing the correct identification coding be received but the received signal strength is of a magnitude less than a first threshold because the belt clip assembly proximity unit 46 is too far away, then step 108 is again executed. FIG. 8(a) shows this situation with the boundary B1, indicating the region where the received signal strength of S1 equals the first threshold. The region within the boundary B1 is referred to as the telephone control field TCF. In all the above circumstances, the telephone proximity unit 16 sounds the alarm at step 108 as a result of having failed to receive an acceptable acknowledgement to the proximity signal S2 transmitted in step 102. At step 108, the alarm is sounded at the main loudspeaker 8 of the telephone by the microprocessor 4 via the tone generator 12 under the instruction of the controller 72. The out-of-range alarm sound is selected to be very distinct from any of the ringing tones with which the telephone may be ordinarily provided. After the alarm has been sounded for a brief interval at step 108, the controller 72 of the radiotelephone proximity unit 16, at step 109, sends instructions to the microprocessor 4 which switches the telephone from its normal mode into a mode in which it waits to have a PIN number entered and all other functions of the telephone, such as the capability to receive or place a call, are unavailable to the user. At step 111, the controller 72 waits to receive instructions from the microprocessor 4 which indicate that the correct PIN number has been entered. Once the correct PIN number has been entered the alarm can be re-enabled via a menu option on the telephone to operate from step 112. On the other hand, the telephone proximity unit 16 can be reset into sleep mode by returning it to the home position in which it is mounted on the belt clip assembly 20. However, should, within interval T, a signal bearing the correct identification coding C1 and within a greater than predetermined magnitude be received, then the telephone proximity unit 16 presumes that the belt clip proximity unit 46 is within range, i.e. within the telephone control field TCF as shown in FIG. 8(b), and a delay is executed at step 110. After the delay, the transmitter 76 is switched back into full power mode at step 112 and proceeds step 102 to repeat the above steps.

Figure 9A:
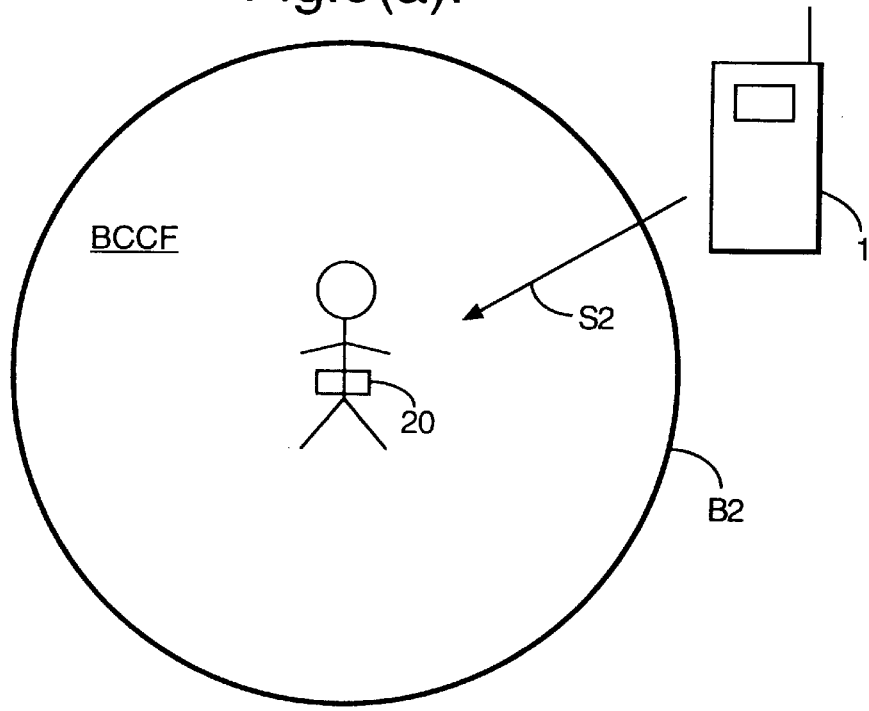
FIGS. 9(a) and 9(b) show diagrams of the control field set up by the belt clip assembly proximity unit.
Figure 9B:
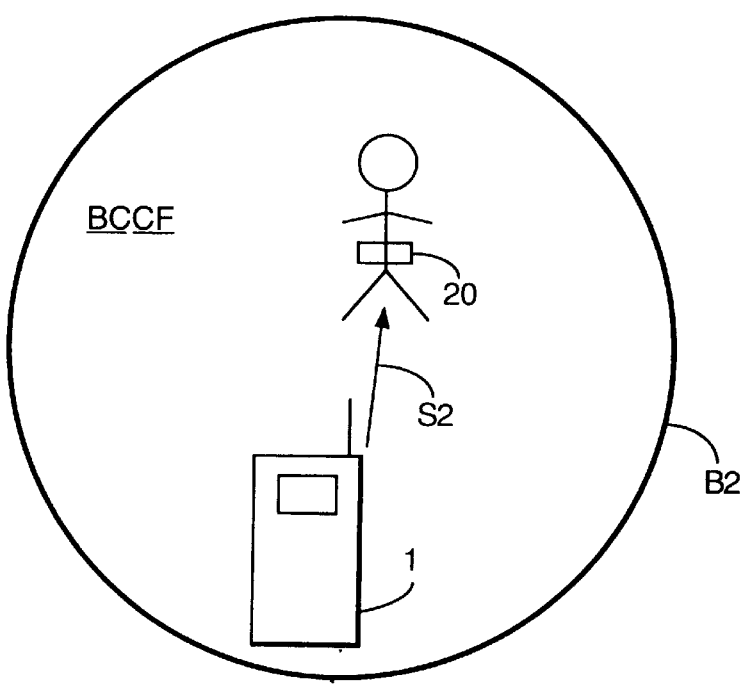

Meanwhile, after the belt clip proximity unit 46 is switched on, the transmitter 56 is placed into reduced power mode at step 122. Next at step 124, its receiver 58 waits to receive the master proximity signal S2 from the 'matched' telephone proximity unit. If no signal is received within a predetermined interval, say again T, or within this interval a signal is received but the identification coding does not match or equal C2, step 126 is performed by which an alarm is sounded for a brief interval. Similarly, should the correct signal S2 bearing the correct identification coding be received but the signal is magnitude less than a second threshold because the telephone proximity unit 16 is too far away, then step 126 is executed. FIG. 9(a) shows this situation with the boundary B2 indicating the region where the signal strength of S2 equals the second threshold. The region within the boundary B2 is referred to as the belt clip control field BCCF. In all the above circumstances, the belt clip proximity unit 46 as a result of having failed to properly receive the master proximity signal S2, sounds an alarm for a brief interval (step 126) via the loudspeaker 57 accordingly and enters the sleep mode at step 127. The operation of the belt clip proximity unit 46 can be resumed at step 122 by pressing the switch 60. However, should, within interval T, a signal bearing the correct identification coding C2 and with a greater than predetermined magnitude be received, then the belt clip proximity unit 46 presumes that the telephone proximity unit 16 is within range, i.e. within the belt clip control field BCCF as shown in FIG. 9(b), and the transmitter 56 is switched into full power mode at step 128. Next, at step 130, the transmitter 56 transmits the slave acknowledgement signal S1 and proceeds to step 122 to repeat the above steps.

If at any time during operation in the away position as described in relation to FIG. 7, the proximity units 16, 46 are returned to the home position, this is detected by the detection circuitries 61, 81 and the proximity units 16, 46 return to the sleep mode.

As a variant to the described method of operation, the proximity units 16, 46 can, at steps 106, 124, defer taking action in response to having failed to receive a valid proximity signal or a proximity signal of acceptable signal strength for a predetermined number of executions of the respective steps. This will assist in preventing false alarms caused by spurious and transient events in the environment. As a refinement of this approach when the telephone proximity unit 16 is receiving a valid proximity signal S1 but the signal strength is repeatedly below the first threshold, the telephone proximity unit 16 can monitor the trend in the received signal strength and this trend can be used to govern the action which is taken, should that be necessary (i.e. after the predetermined number of executions of step 106). For example, if after the predetermined numbers of executions of step 106, the controller 72 determines that the telephone and belt clip proximity units 16, 46 are moving apart very rapidly, then the telephone can be completely disabled as described above. On the other hand, if the telephone and belt clip proximity units 16, 46 are not moving apart rapidly or are stationary, then only an alarm need be sounded.

These variants can also be applied to the other preferred embodiment which is described later.

It will be appreciated that the size of the telephone control field TCF is determined by the transmitting power of the transmitter 56 of the belt clip assembly proximity unit 46 and the first threshold. Likewise, the size of belt clip control field BCCF is determined by the power of the transmitter 76 of the telephone proximity unit 16 and the second threshold. The size of the control fields TCF and BCCF are selected such that when the user makes use of the telephone 1 in the normal way, the telephone 1 remains within the control fields. A typical suitable size for the control fields TCF and BCCF is 2–3 meters.

The controller 52 is also responsive to the remaining charge available from the power supply 50 and, when the remaining charge is below a predetermined threshold, the controller 50 sounds a brief alarm, from time to time, via the loudspeaker 57 to indicate this. The alarm which is signalled in these circumstances is distinct from the out-of-range alarm mentioned above.

In other embodiments of the invention, the telephone proximity unit 16 need not act as the master, but can perform the role of the slave. In other embodiments, either one of the proximity units can act as a 'passive relay' for the proximity signal transmitted by the other proximity unit. The passive relay can comprise a simple resonance circuit and an antenna, and is operable to reflect the proximity signal, modified by the characteristics of the resonance circuit, back to the other proximity unit.

Another preferred embodiment of the invention, in which only a one-way communication link is established between the proximity units of the belt clip and the telephone, is shown in FIG. 10. Similar parts have been given the reference numerals.

In operation, when the telephone 1 is in its home position mounted to the belt clip assembly 20, both proximity units 16, 46 are in the sleep mode. In the away position, when the telephone 1 becomes uncoupled from the belt clip assembly 20, the proximity units 16, 46 are switched on and operate as shown in the flow diagram of FIG. 11.

Referring first to the operation of the telephone proximity unit, its receiver 78, at step 202, waits to receive a proximity signal S1 from the matched belt clip proximity unit 46. If a signal is received within a predetermined interval, say T, having a received signal strength greater than a threshold and bearing an identification coding which matches C1, then step 202 is re-executed immediately. This situation corresponds to FIG. 8(b) in which the belt clip proximity unit 46 is within the boundary B1 of the telephone control field TCF.

On the other hand, if it is determined at step 202 within the predetermined interval T that no signal is received, or a signal is received but the identification coding does not match C1, or the received signal does bear the correct identification coding C1 but has a signal strength of magnitude below the threshold, then the controller 72 presumes that the situation in FIG. 8(*a*) exists and sounds an out-of-range alarm for a brief interval at step 204.

After step 204 the telephone proximity unit enters a search mode. In the search mode, the controller 72 at step 206 sends instructions to the microprocessor 4 which switches the telephone 1 from its normal mode into a mode in which its calling placing capability is inhibited but all other functions of the telephone 1 remain available to the user. Next at step 208, the receiver 78 again waits to receive a proximity signal S1 from the matched belt clip proximity unit 46. If a signal is received within a predetermined interval, say T, having a received signal strength greater than a threshold and bearing an identification coding which matches C1, then the situation in FIG. 8(*b*) is again presumed to exist and so step 210 is executed by which the controller 72 sends instructions to the microprocessor 4 which switches the telephone 1 back into its normal mode. Step 202 is then repeated. On the other hand, if it is determined at step 208 within the predetermined interval T that no signal is received or a signal is received but the identification coding does not match C1, then step 208 is immediately re-executed. However, if a signal is received bearing the correct identification coding C1, but the strength of this signal is below the threshold, step 212 is executed by which the controller 72 sends instructions to the microprocessor 4 which cause the loudspeaker 8 of the telephone 1 to emit a brief locating alarm having a pitch and/or volume proportional to the received signal strength of S1. The characteristics of the locating alarm thus assist the user in homing in on the telephone 1. Step 208 is then repeated. The locating alarm of step 212 is selected to be very distinct from the out-of-range alarm of step 204.

Meanwhile, after the belt clip proximity unit 46 is switched on, its transmitter 56 is placed into full power mode at step 220. Next, at step 222, the transmitter 56 transmits the proximity signal S1. Afterwards, at step 224, the transmitter 56 is placed into reduced power mode. After a delay of T at step 226, the belt clip proximity unit 46 returns to step 220. The switch 60 can be used to toggle the belt clip proximity unit 46 between the operation shown in FIG. 11 and sleep mode.

Figure 11:
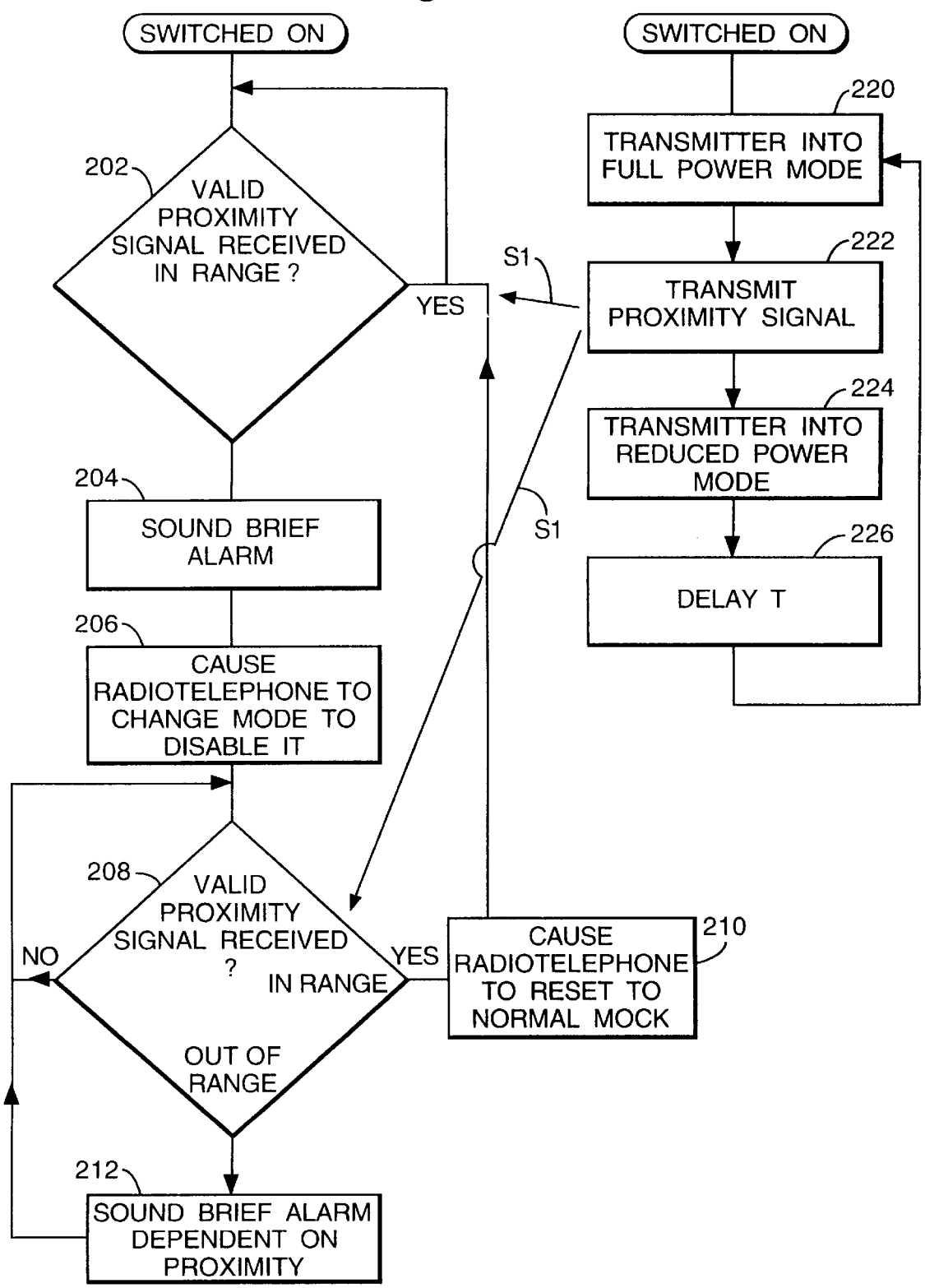
FIG. 11 is a flow diagram showing the operation of the proximity in the away position.

In a similar way to the first preferred embodiment, if at time during operation in the away position as described in relation to FIG. 11, the proximity units 16, 46 are returned to the home position, this is detected by the detection circuitries 61, 81 to cause the proximity units 16, 46 to return to the sleep mode.

In other embodiments, the first preferred embodiment (FIG. 6) can be modified to include the search mode provided in the telephone proximity unit of the second preferred embodiment (FIG. 10). In such an embodiment, the search mode can also be provided in the belt clip proximity unit.

When it is stated in the described embodiments that the telephone 1 sounds an alarm because the telephone and belt clip proximity units 16, 46 are outside acceptable range of each other, in other embodiments, this audio alarm can be accompanied or replaced by other forms of alarm. Other forms of alarm include a visual alarm displayed on the display 5. The visual alarm comprises an indication, based on text or an icon/symbol, that the out-of-range condition exists, and/or the name of the authorised user of the telephone 1. The display of the name of the authorised user can be useful in ensuring that a similar telephone belonging to a third party is not mistakenly picked up. Another alarm takes the form of the telephone automatically sending a message to a predetermined number.

We claim:

1. A proximity detector system for a radio telephone comprising:

a radiotelephone controlled by a microprocessor;

a first detector operatively associated with said microprocessor, said first detector having a transmitter, a receiver, and a controller, said transmitter generating a first proximity signal;

a second detector detachably mounted to said radiotelephone, said second detector having a transmitter and a receiver, said transmitter generating a second proximity signal in response to the receipt of said first proximity signal; and wherein the said first proximity signal is generated only when said second detector is detached from said radiotelephone, and wherein the controller of the first detector measures the signal strength of the second proximity signal and compares said strength to a predetermined threshold, said controller further causing said microprocessor to disable operation of the radiotelephone when said signal strength of the second proximity signal is below said predetermined threshold.

2. A proximity detector system for a radio telephone, as described in claim 1, wherein the radio telephone remains disabled until a predetermined user identification signal is received by the microprocessor.

3. A method of disabling the operation of a radiotelephone in the event that the radiotelephone becomes lost or stolen, said radiotelephone having a microprocessor, said method comprising the steps of:

mounting a first detector on the radio telephone in operative association with said microprocessor;

detachably mounting a second detector on the radio telephone;

transmitting a first proximity signal from said first detector when said second detector becomes detached from said radiotelephone;

receiving said first proximity signal at said second detector and generating a second proximity signal from said second detector in response to said first proximity signal;

receiving said second proximity signal at said first detector, measuring the signal strength of said second proximity signal, comparing said signal strength of said second proximity signal to a predetermined threshold; and causing said microprocessor to disable the radiotelephone when said signal strength is less than the predetermined threshold.

4. A method of disabling the operation of a radiotelephone in the event that the radiotelephone becomes lost or stolen, said radiotelephone having a microprocessor, said method, as described in claim 3, wherein the disabling of the microprocessor may be avoided by presenting a predetermined user identification to the microprocessor.

* * * * *